US012763618B2

(12) United States Patent

Modi et al.

(10) Patent No.: US 12,763,618 B2
(45) Date of Patent: Oct. 13, 2026

(54) THERMAL MANAGEMENT FOR STATOR COOLING IN ELECTRIC MACHINE

(71) Applicant: FCA US LLC, Auburn Hills, MI (US)

(72) Inventors: Prashant Modi, Auburn Hills, MI (US); Dhafar Al-Ani, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 153 days.

(21) Appl. No.: 18/947,205

(22) Filed: Nov. 14, 2024

(65) Prior Publication Data

US 2026/0135423 A1 May 14, 2026

(51) Int. Cl.
*H02K 9/19* (2006.01)
*H02K 1/20* (2006.01)
*H02K 1/276* (2022.01)
*H02K 7/00* (2006.01)

(52) U.S. Cl.
CPC ............... *H02K 1/20* (2013.01); *H02K 1/276* (2013.01); *H02K 7/003* (2013.01); *H02K 9/19* (2013.01)

(58) Field of Classification Search
CPC .......... H02K 1/20; H02K 1/276; H02K 7/003; H02K 9/19; H02K 3/24
See application file for complete search history.

(56) References Cited

U.S. PATENT DOCUMENTS

| | | | | |
|---|---|---|---|---|
| 8,872,399 | B2 * | 10/2014 | Chamberlin | H02K 9/197 310/58 |
| 9,831,746 | B2 * | 11/2017 | Maki-Ontto | H02K 9/02 |
| 10,243,419 | B2 | 3/2019 | Gugel et al. | |
| 11,251,682 | B2 | 2/2022 | Lee et al. | |
| 11,539,256 | B2 * | 12/2022 | Diehl | H02K 9/197 |

FOREIGN PATENT DOCUMENTS

| | | | |
|---|---|---|---|
| CN | 102593975 | A | 7/2012 |
| CN | 212649253 | | 3/2021 |
| DE | 102018222137 | A1 | 6/2020 |

* cited by examiner

*Primary Examiner* — Leda T Pham
(74) *Attorney, Agent, or Firm* — Jeremy J. Klobucar

(57) ABSTRACT

An electric machine includes a rotor, a stator, and a housing. The stator can include: teeth and yoke regions, the teeth region being proximate teeth of the stator and radially inward of the yoke region; first axial channels in the yoke region extending axially through the stator substantially from one axial end to the opposite axial end; second axial channels in the teeth region extending axially through the stator substantially from the one axial end to the opposite axial end, the second axial channels being proximate the stator teeth and radially inboard from the first axial channels; and a cross-bridge radial channel extending between and connecting a pair of radially opposed first and second axial channels. The electric machine is configured to receive cooling oil into the first and second axial channels such that the oil flows axially and radially within the stator to cool at least the stator.

13 Claims, 10 Drawing Sheets

THERMAL MANAGEMENT FOR STATOR COOLING IN ELECTRIC MACHINE

FIELD

The present application generally relates to thermal management of electric machines and, more particularly, to thermal management of a stator of an electric machine, such as for electrified vehicle powertrains.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A conventional electric machine includes a stator and a rotor. The stator is supplied with energy (i.e., current) to generate a magnetic field that causes the rotor to rotate and generate torque. The operation of an electric machine generates heat which causes the temperature of the components inside the electric machine to rise, such as the magnets in the rotor for Permanent Magnet (PM) types of electric machines, the bars in the rotor for induction machines (IMs), and the coils in the externally excited synchronous machine (EESM). Such magnets have thermal limits, above which they begin to lose their effectiveness (demanganization). As a result, conventional electric machines often limit their performance to maintain rotor temperatures below such thermal limits. One example implementation of an electric machine is in a vehicle's torque generating system or transmission for propulsion. Conventional electric machines are typically directly cooled by employing oil spray/splash in direct contact with the electric machine's outer axial ends. While such electric machine thermal management techniques do work for their intended purpose, there remains a desire for improvement in the relevant art.

SUMMARY

According to one example aspect of the invention, an electric machine having a thermal management system and for use in an electrified vehicle is provided. In one exemplary implementation, the electric machine includes a rotor, a stator, a housing, and a thermal management system. The electric machine can also include an oil feed channel at least partly positioned in the housing and configured to provide cooling oil to at least the stator. The stator can include: a stator teeth region and a stator yoke region, the stator teeth region being proximate teeth of the stator and positioned radially inward of the stator yoke region; a plurality of first axial channels in the stator yoke region extending axially through the stator substantially from one axial end to the opposite axial end, a plurality of second axial channels in the stator teeth region extending axially through the stator substantially from the one axial end to the opposite axial end, the second axial channels being proximate the stator teeth and positioned radially inboard from the first axial channels, and at least one cross-bridge radial channel extending between and connecting a pair of radially opposed first and second axial channels of the plurality of first and second axial oil channels. The electric machine is configured to receive the cooling oil into the first and second plurality of axial oil channels such that the cooling oil flows axially and radially within the stator to cool at least the stator.

In some implementations, each of the plurality of first axial channels includes a first open end and an opposed first closed end, and wherein each of the plurality of second axial channels have a second open end and an opposed second closed end.

In some implementations, the first closed end is positioned at one of the first and second axial ends, and the second closed end is positioned at the other of the first and second axial ends.

In some implementations, cooling oil enters the stator via the first open end of the plurality of first axial channels, and exits the stator via the second open end of the plurality of second axial channels. In some implementations, the cooling oil exiting the stator via the second open end sprays onto end windings of the electric machine to cool the end windings.

In some implementations, the at least one cross-bridge radial channel includes a plurality of cross-bridge radial channels spaced apart axially along and connecting the pair of opposed first and second axial channels between the first and second open and closed ends of the pair of opposed first and second axial channels.

In some implementations, the pair of opposed first and second axial channels includes a plurality of pairs of opposed first and second axial channels spaced circumferentially apart around the stator, and wherein each of the plurality of pairs of opposed first and second axial channels includes the at least one cross-bridge channel.

In some implementations, each of the plurality of pairs of opposed first and second axial channels includes the plurality of cross-bridge radial channels spaced apart axially along and connecting each pair of opposed first and second axial channels between the first and second open and closed ends.

In some implementations, the plurality of first axial channels includes a same number of channels as the plurality of second axial channels. In some implementations, the same number of channels is equal to a number of slots in the stator that form the stator teeth region.

In some implementations, the pair of opposed first and second axial channels includes a plurality of pairs of opposed first and second axial channels, wherein the at least one cross-bridge radial channel includes a plurality of cross-bridge radial channels, and wherein each pair of the plurality of pairs of opposed first and second axial channels includes the plurality of cross-bridge radial channels spaced apart axially along and connecting the pair of opposed first and second axial channels between the first and second open and closed ends.

In some implementations, a number of the plurality of pairs of opposed first and second axial channels including the plurality of cross-bridge radial channels is less than a total number of plurality of pairs of opposed first and second axial channels included in the stator.

In some implementations, the rotor includes a hollow shaft configured to receive the cooling oil and direct the same to contact the end windings to cool the end windings.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

The present disclosure will become more fully understood from the detailed description and the accompanying drawings, given purely by way of non-limiting example, wherein.

DETAILED DESCRIPTION

As previously discussed, the operation of an electric machine generates heat which causes the temperature of the components inside the electric machine to rise. At least two of the important components in the electric machine that need to be cooled are the rotor and the stator. Certain magnets in the rotor are typically demagnetized at temperatures above ~150 degrees Celsius (based on the type and grade of magnet) and electric machine operation is often constrained to ensure that the magnet temperature does not exceed this threshold.

A conventional electric machine thermal management technique is oil cooling by spraying/splashing. Oil cooling architectures use oil spray/splash directly on the machine surfaces for cooling, such as typically the axial ends of the rotor and stator. The heat is dissipated from contact of the cooling oil and the heat sources. This method is typically referred to as "direct-oil-spray-cooling". One main approach is oil spray from the center towards the stator, driven by rotor rotation. In this approach, the oil is sprayed from the shaft ends towards the end-windings and stator laminations. In this case oil spray is driven by centrifugal forces caused by the rotation of the rotor. This approach attempts to cool the rotor by heat transfer via external rotor surfaces. The external rotor surfaces are mainly the rotor axial ends, exposed to the cooling oil.

The improved thermal management system of the application can be applied to various types of electric machines or machines including, but not limited to Interior Permanent Magnet (IPM), Surface-mounted Permanent Magnet (SPM), Induction Machine (IM), Switching reluctance Machine (SRM) Permanent Magnet-Assisted Synchronous Reluctance Machine (PMSRM), Wound Rotor Synchronous Machine (WRSM), Axial Flux Machine, and Externally Excited Synchronous Machine (EESM).

Figure 1:
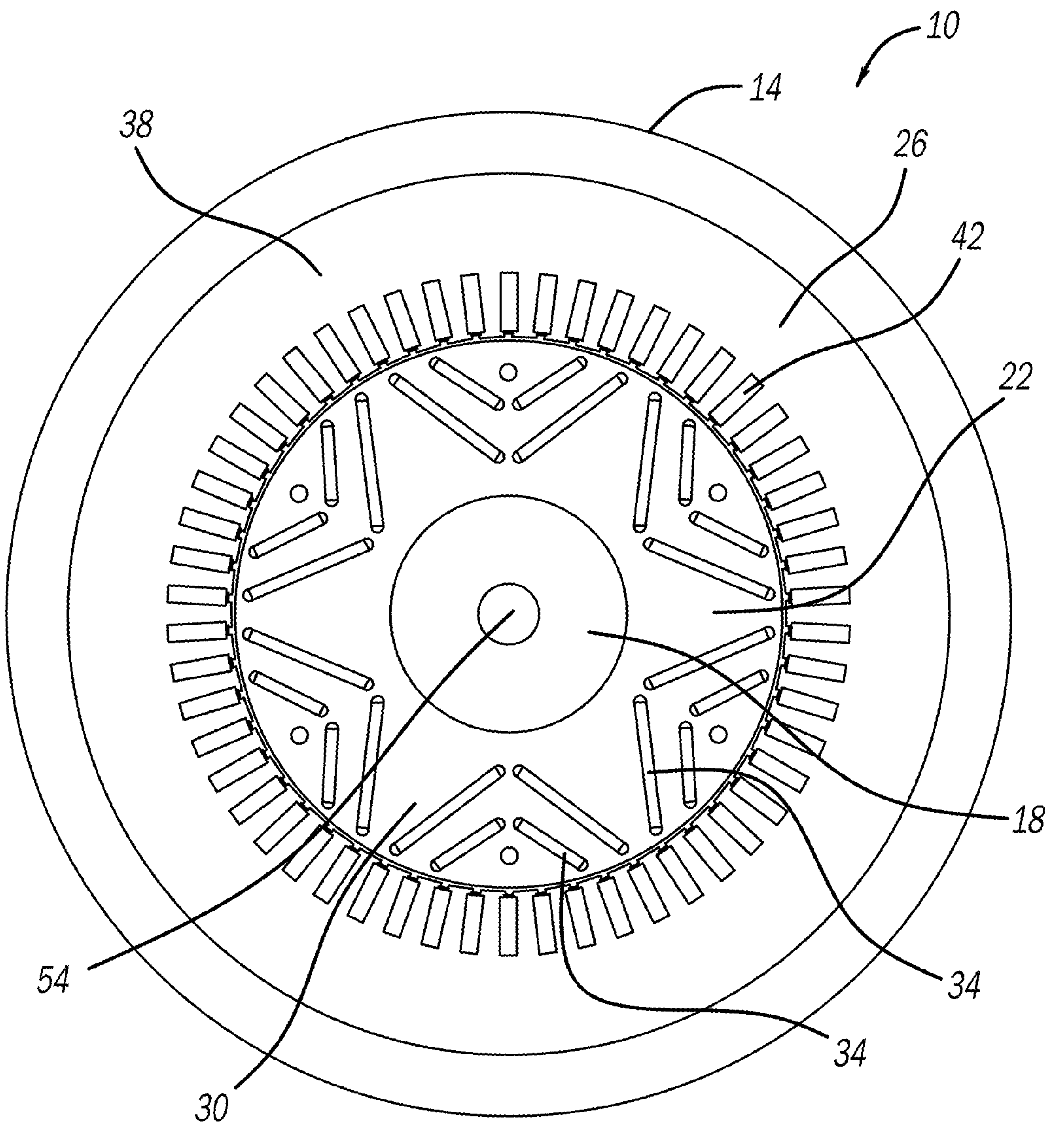
FIG. 1 Prior Art
FIG. 1 is an example radial cross-sectional schematic view of an electric machine according to the prior art.
Figure 2:
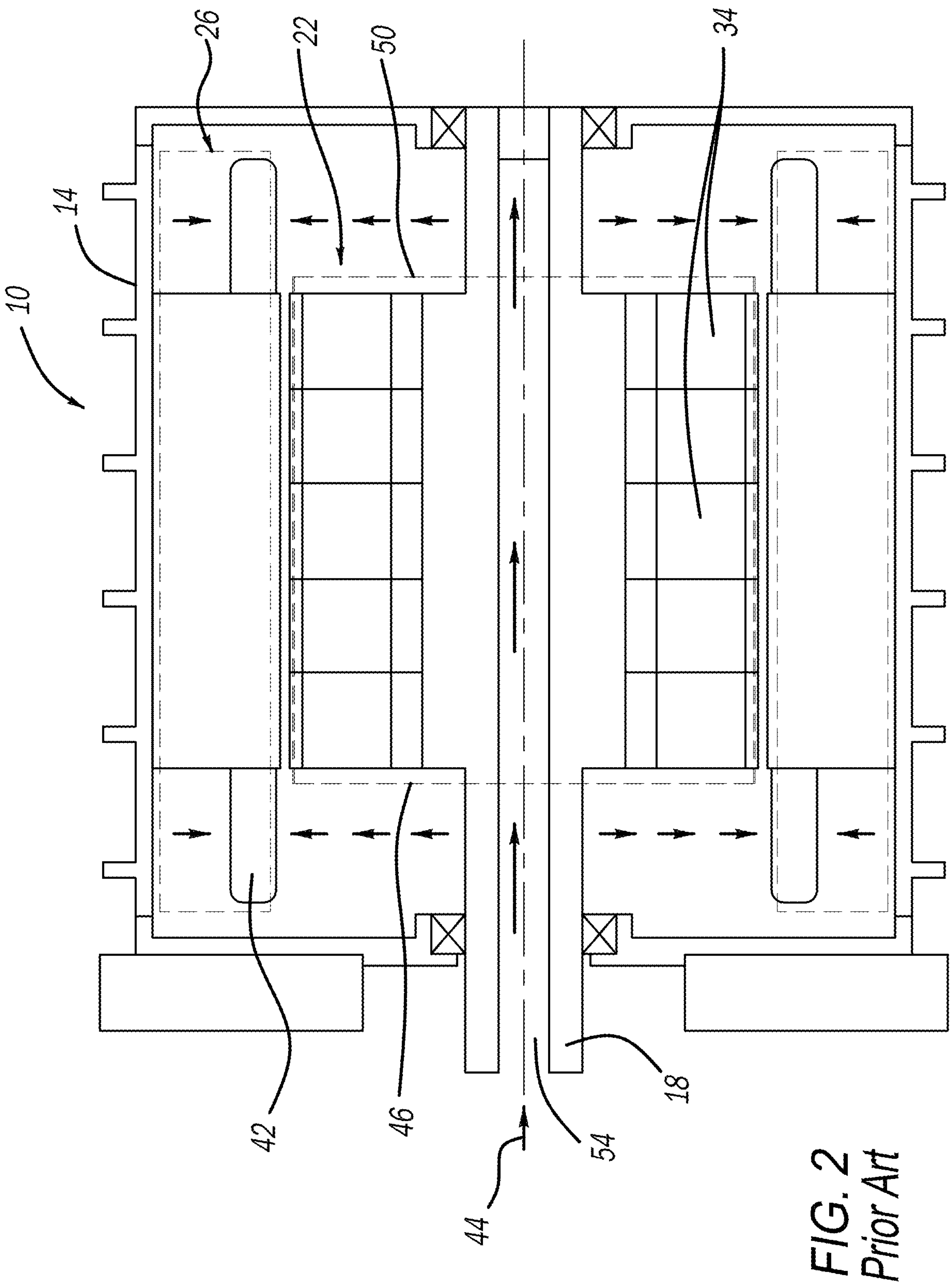
FIG. 2 Prior Art
FIG. 2 is an example axial cross-sectional schematic view of the electric machine according to the prior art.

Turning now to the drawings, FIGS. 1 and 2 show certain main components of a conventional electric machine identified at reference numeral 10. The electric machine 10 includes a housing 14, a central hollow shaft 18 supporting a rotor 22, and a stator 26. In one example implementation, the rotor 22 includes and is formed by a plurality of rotor lamination plates 30 and magnets 34, as is known in the art. In this example implementation, the stator 26 includes stator laminations 38 and windings 42, as is also known in the art. In this example, the rotor 22 and stator 26 are cooled using the direct-oil-spray technique discussed above where oil 44 is splashed on the respective axial ends 46, 50 of the rotor 22 and stator 26.

The electric machine 10 can be utilized in an electrified powertrain of a vehicle. The electrified powertrain, in one example is controlled by one or more controllers or a control system so as to achieve a desired/requested amount of drive torque in response to a driver pedal request. The powertrain may include one or more electric machines 10 that generate drive torque and are selectively coupled to or form part of a transmission for transfer of drive torque to a driveline.

Figure 3:
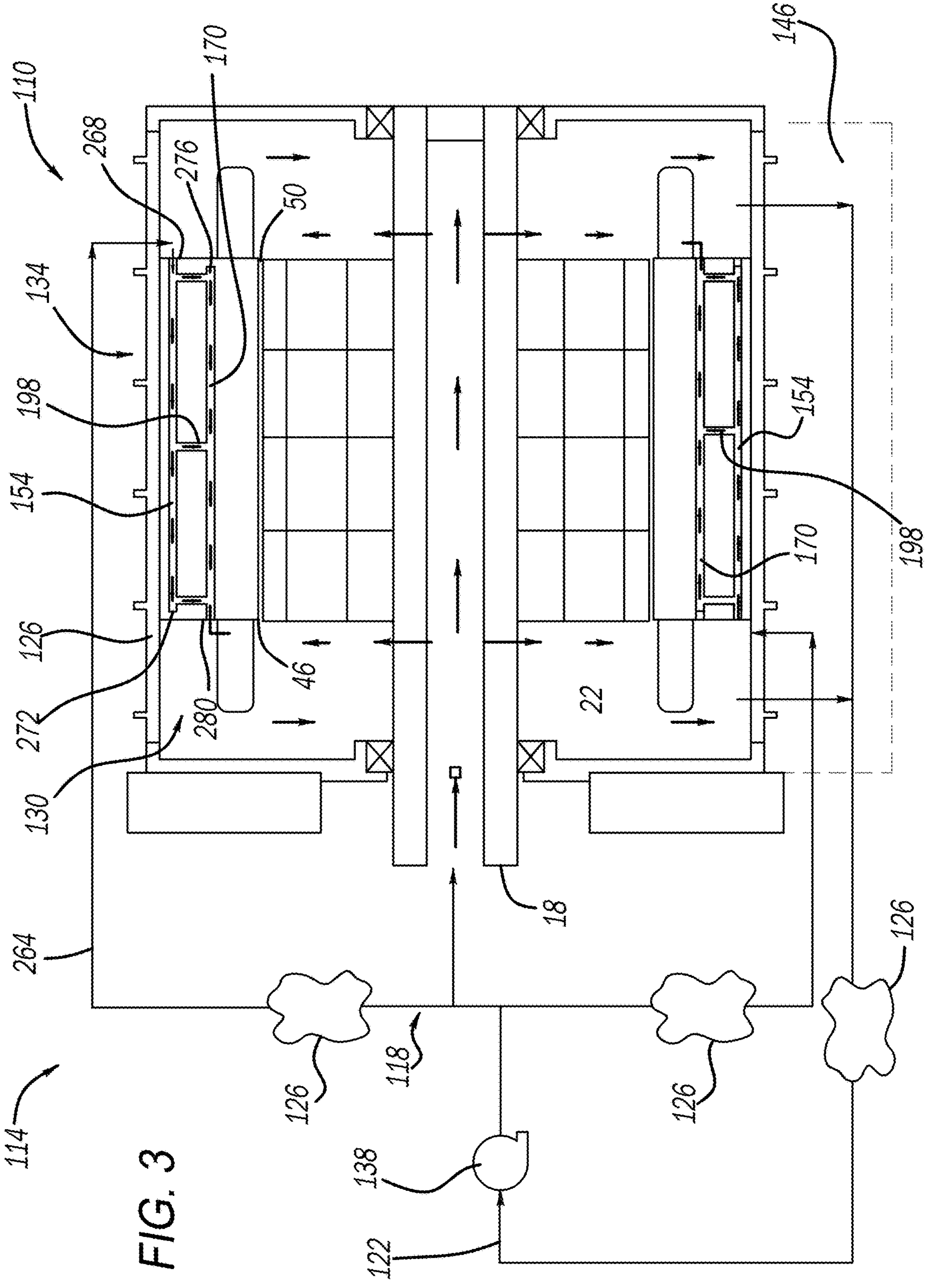
FIG. 3 is an example axial cross-sectional schematic view of an improved electric machine having an improved thermal management system including axial channels and bridging radial channels in the stator for receiving cooling oil to cool at least the stator according to the principles of the present application.

Turning now to FIG. 3 and with continuing reference to FIG. 12, an improved electric machine 110 having an improved thermal management system 118 will now be discussed in accordance with the principles of the present application. Components of electric machine 110 that are substantially similar or the same as in electric machine 10 will retain the same reference numerals.

Electric machine 110 includes the thermal management system 114 which includes an improved cooling oil circuit 118 facilitating cooling fluid such as oil 122 flow and/or circulation through a housing or housing assembly 126 of electric machine 110 and through an improved stator 130 having a cooling channel system 134 configured to receive the cooling oil 122 to cool the stator 130. The cooling oil 122, such as lubricating and/or cooling oil, can be circulated through the cooling circuit 118 by a pump 138 drawing the oil 122 from an oil sump 146.

Before continuing with a discussion of the improved thermal management system 114, it will be appreciated that the stator 130 can be formed using various techniques including through the use of a plurality of stacked stator lamination plates 132, as is generally known in the art of stator manufacturing. In this regard, the radial sectional schematic views of FIGS. 4A, 5A and 6A can also be viewed as a single lamination plate 132 with various cutouts that are used to form radial and axial channels in the stator 130, as discussed herein. The axial sectional schematic views of corresponding FIGS. 4B, 5B and 6B illustrate a complete stack of a plurality of lamination plates 132 stacked/coupled together to form the stator or stator core 130 having the radial and axial channels, as discussed herein.

Figure 4A:
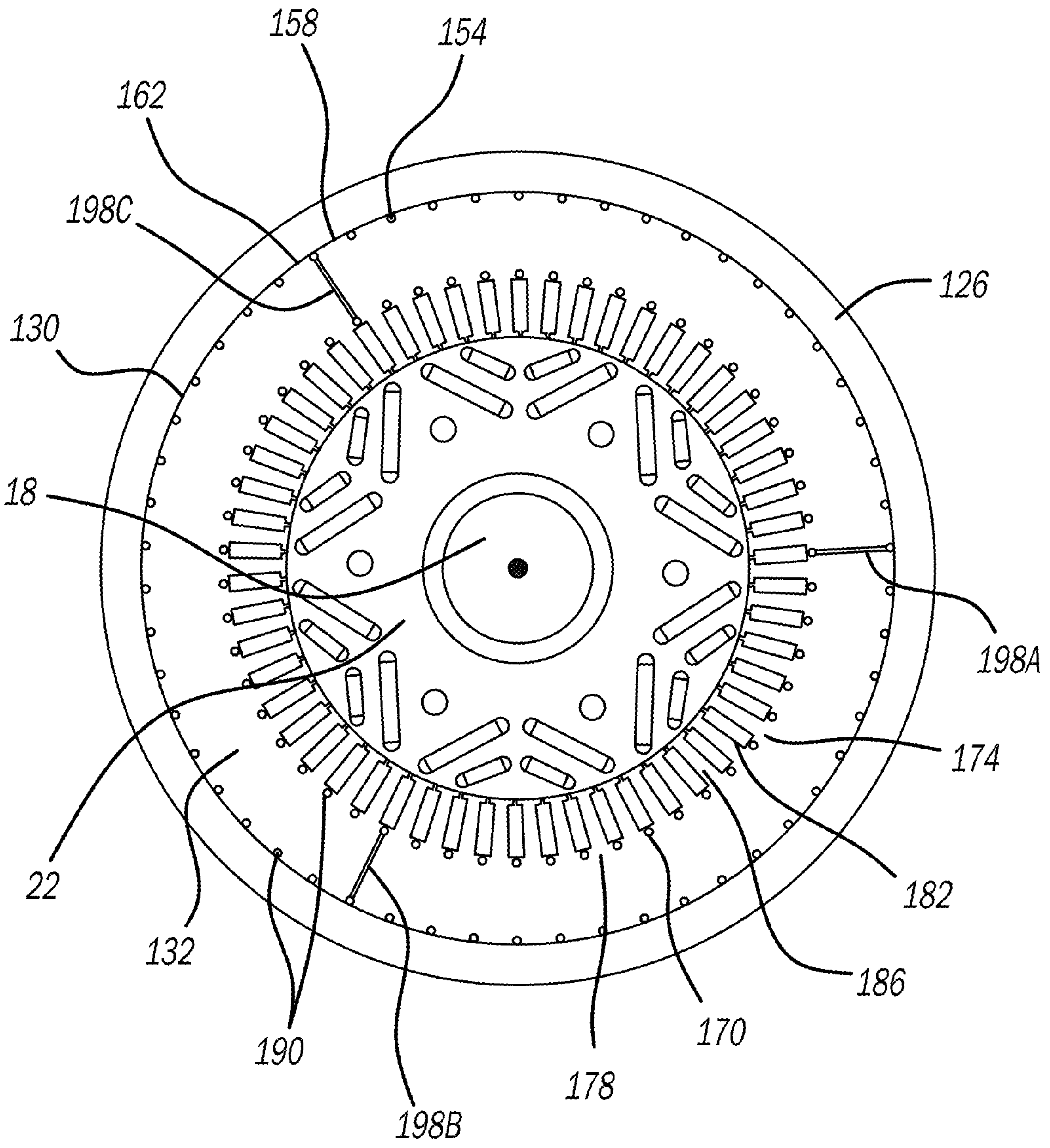
FIG. 4A is an example radial cross-sectional schematic view of the stator of the improved electric machine and FIG. 4B is a corresponding axial cross-sectional schematic view of the stator showing aspects of the improved thermal management system including axial channels and bridging radial channels in the stator for receiving cooling oil to cool the stator according to the principles of the present application.
Figure 4B:
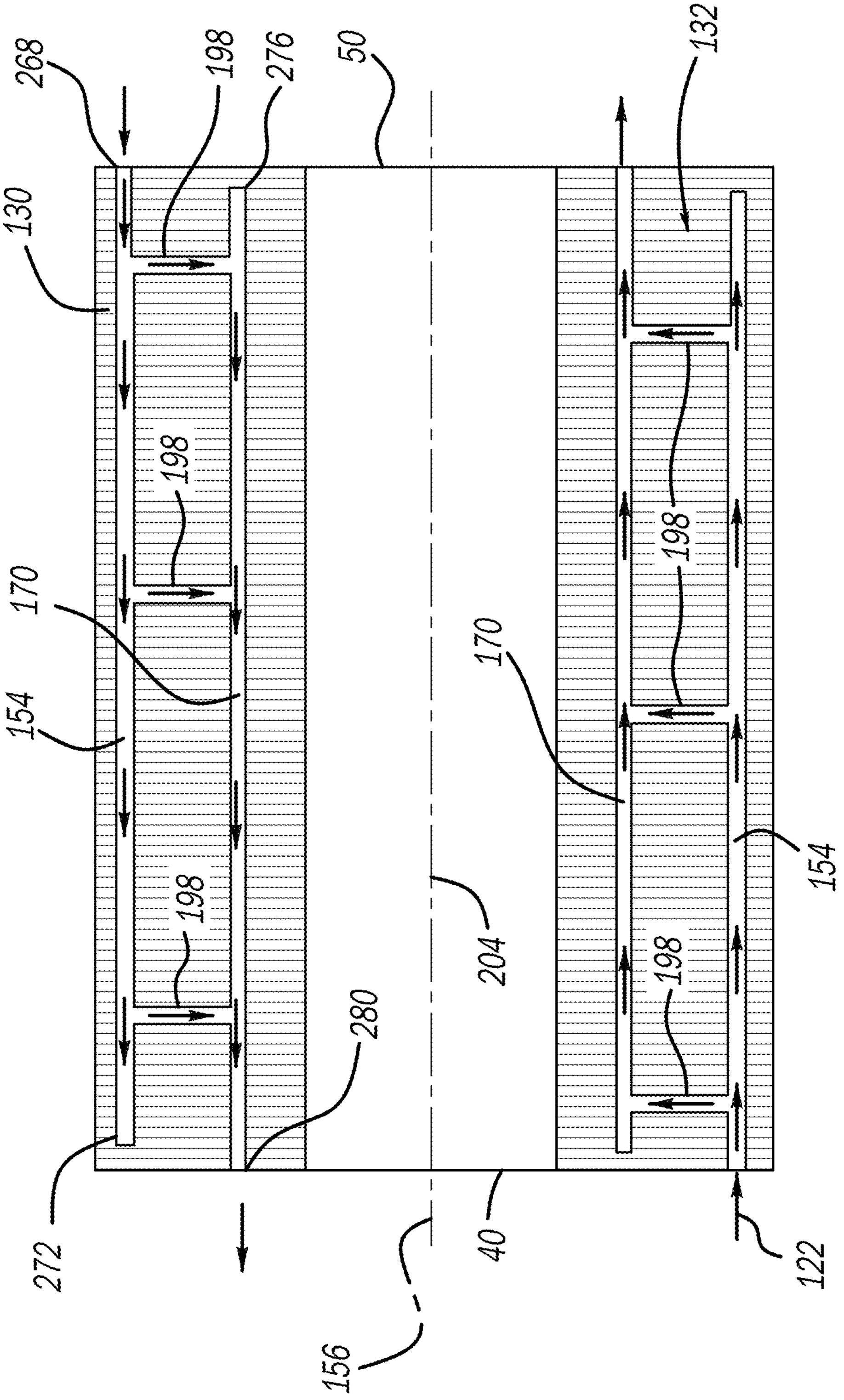

Turning now to FIGS. 4A-4B, an example of the improved thermal management system 114 will now be discussed. In this example, the stator 130 includes a first plurality of axial channels 154 circumferentially spaced apart around a radially outer area 158 of the stator core 130 at a first radial distance from a rotating axis of 156 of rotor 22. In one exemplary implementation, the radial outer area 158 is substantially at or contiguous to a radially outer end 162 of stator core 130. The radially outer area can also be referred to as the stator yoke region or area 158.

Stator 130 can also include a second plurality of axial channels 170 circumferentially spaced apart around a radially inward area 174 of stator 130 at a second radial distance 178 from axis 156. In the example illustrated, the second distance is less than the first distance. The radially inward area 174 can also be referred to as the stator teeth region or area 174. In one exemplary implementation, the stator teeth region or area 174 includes a plurality of radial stator slots 182 forming stator teeth 186, which radially end or terminate at a radial distance substantially at the stator second radial distance 178. In one example implementation, the number of axial channels equals the number of stator slots 182. In one example implementation, the axial channels 170 are aligned with the stator slots 182.

In one exemplary implementation, the stator 130 includes the same number of first and second axial channels so as to form a plurality of pairs of axial channels 190 radially aligned with each other. It will be appreciated, however, that the pairs of axial channels 190 may have other alignment configurations, such as being radially offset from each other. It will also be appreciated that different numbers of axial channels 154, 170 may be used depending on different rotor sizes and performance characteristics, for example.

Stator 130 can also include a plurality of radially extending cross-bridge channels 198 connecting one or more pairs of axial channels 190. The cross-bridge channels 198 can be positioned at various circumferential locations spaced apart from each other as shown in FIG. 4A, for example, where there are three cross-bridge channels 198 spaced circumferentially around stator 130 connecting three different pairs of axial channels 190. The stator 130 can also include various numbers of cross-bridge channels spaced axially along a longitudinal length or direction 204 of stator 130 between the first axial end 40 and the second, opposite axial end 50. In the particular example illustrated in FIGS. 4A and 4B, there are three sets of cross bridge channels 198A, 198B, 198C, with each set having three axially spaced apart cross bridge channels 198.

These axial channels 154, 170 can serve two critical purposes—stator weight reduction to increase efficiency and cooling of the stator 130 via oil 122 flowing through the axial and radial channels 154, 158 and cross bridge channels 198, as will be discussed in greater detail below. In addition, the n umber of cross bridge channels 198 can also serve another critical purpose, namely addressing noise-vibration and harshness characteristics of the machine assembly 110 by strategically varying the placement and number of cross-bridge channels 198 within stator 130.

Figure 5A:
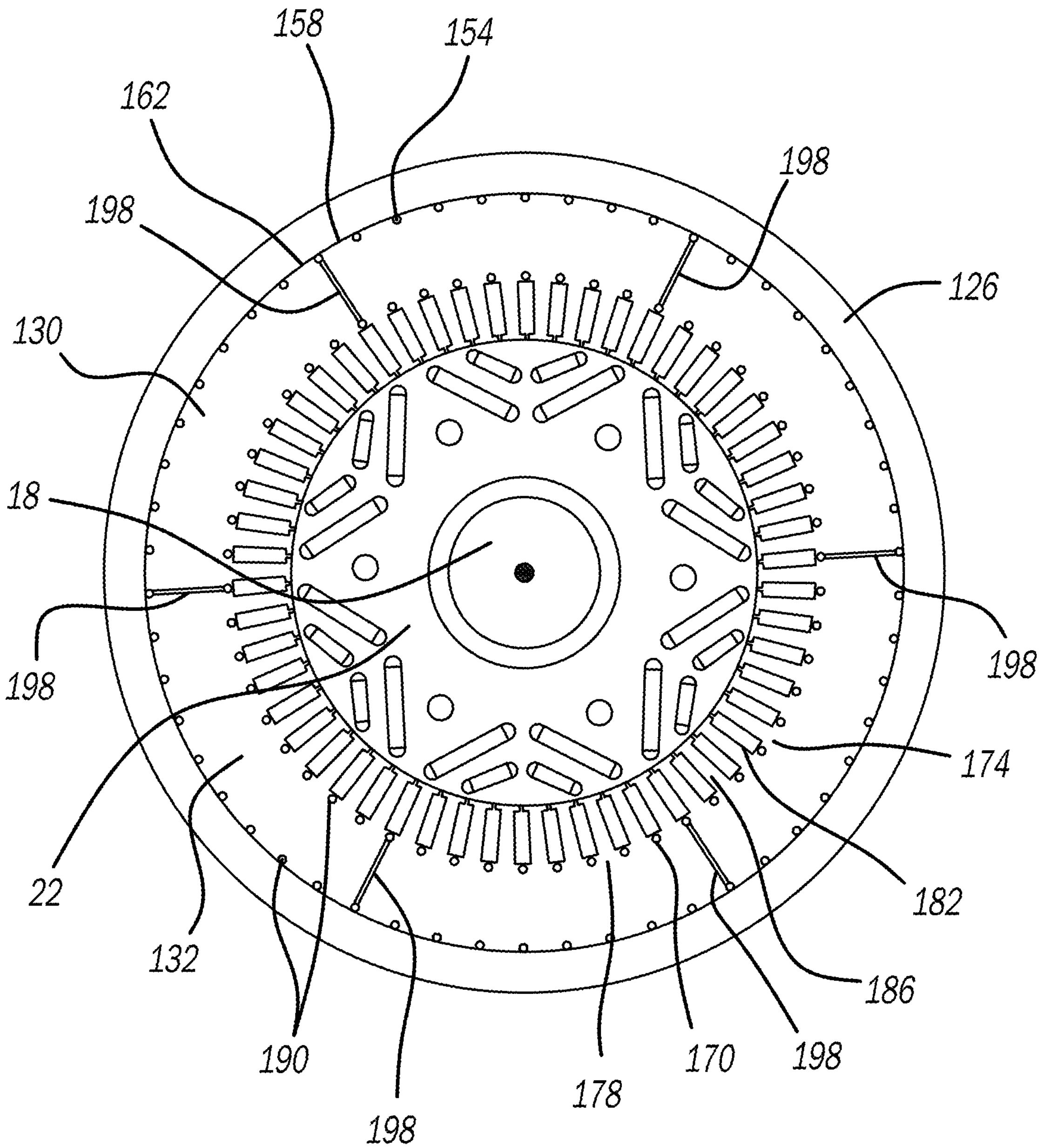
FIG. 5A is an example radial cross-sectional schematic view of the stator of the improved electric machine and FIG. 5B is a corresponding axial cross-sectional schematic view of the stator showing aspects of the improved thermal management system including axial channels and bridging radial channels in the stator for receiving cooling oil to cool the stator according to the principles of the present application.
Figure 5B:
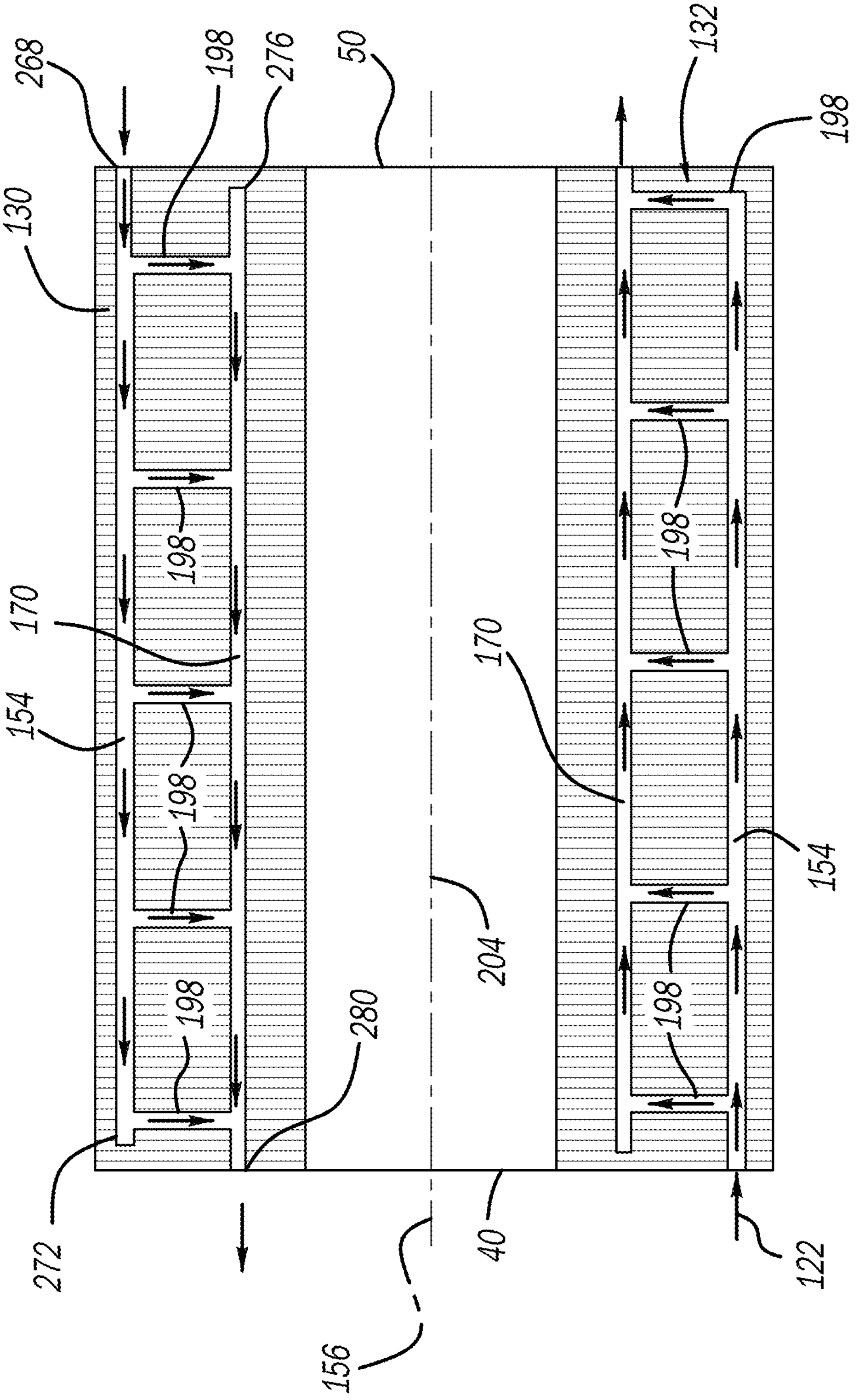
Figure 6A:
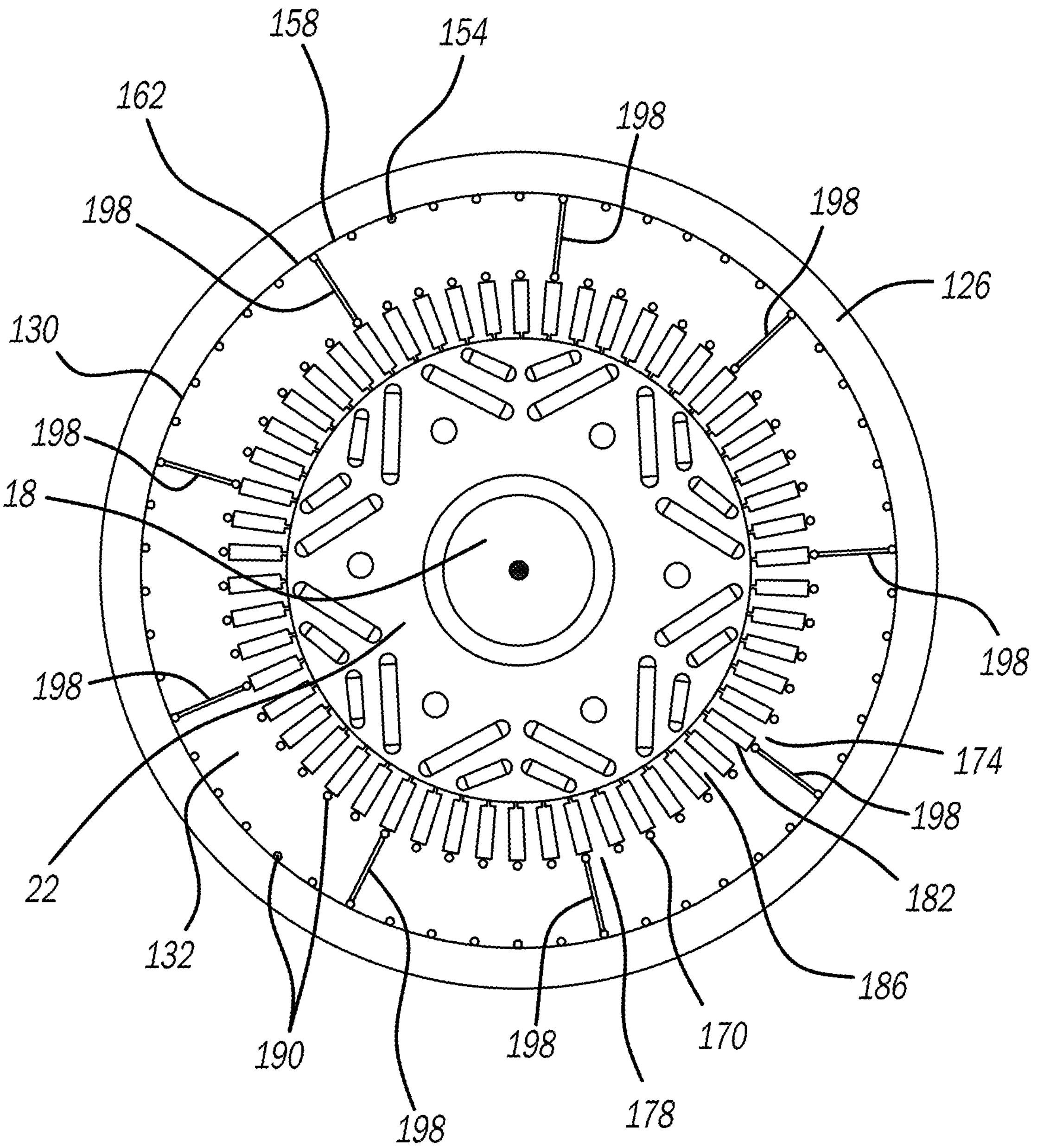
FIG. 6A is an example radial cross-sectional schematic view of the stator of the improved electric machine and FIG. 6B is a corresponding axial cross-sectional schematic view of the stator showing aspects of the improved thermal management system including axial channels and bridging radial channels in the stator for receiving cooling oil to cool the stator according to the principles of the present application.
Figure 6B:
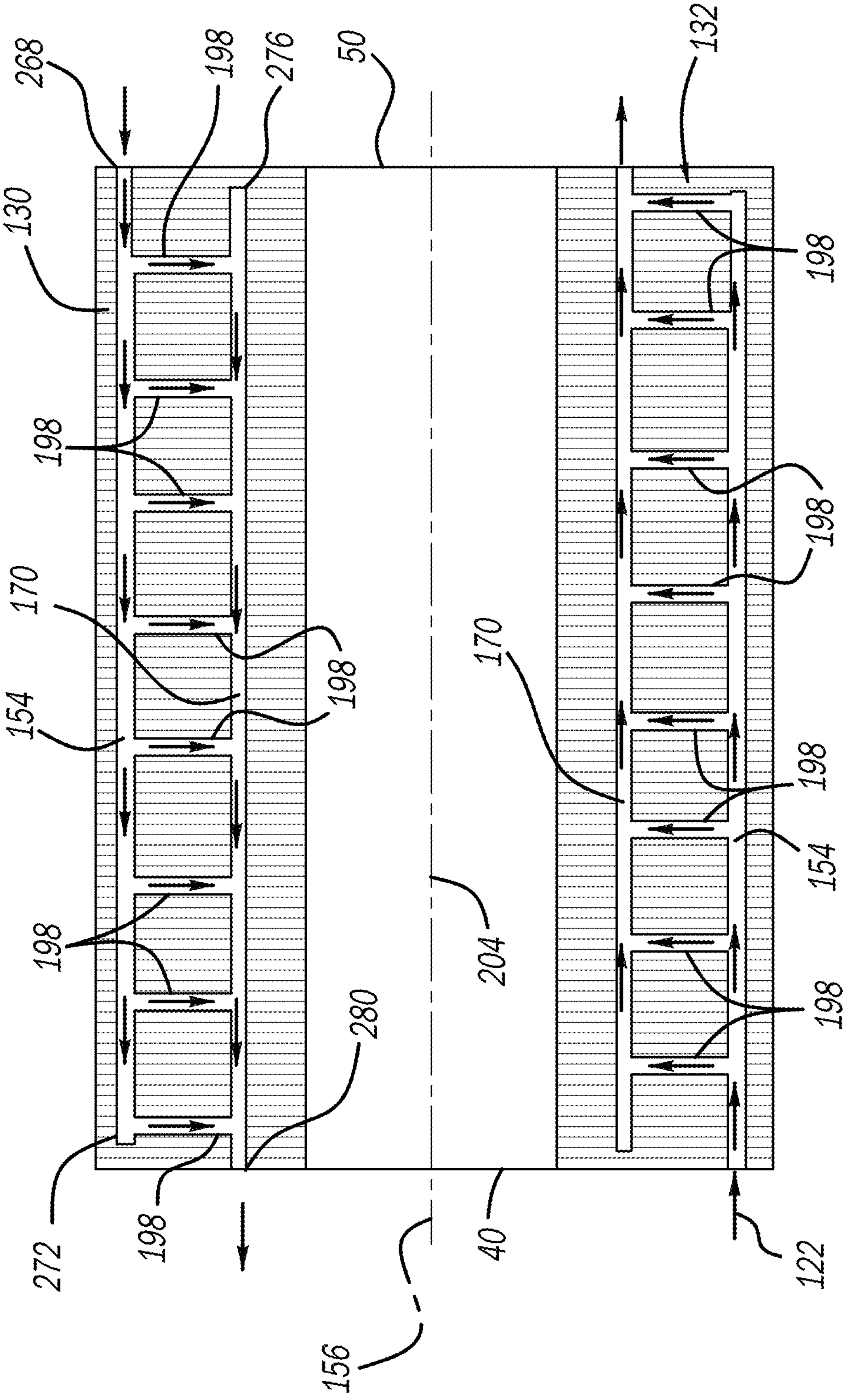
Figure 7A:
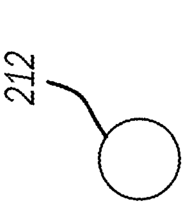
FIGS. 7A-7L illustrates various example channel shapes that may be formed in stator laminations to form the cross-sectional shape of the axial channels and bridging radial channels of the improved stator in accordance with the principles of the present application.
Figure 7B:
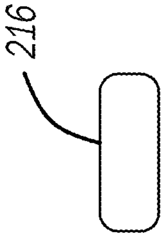
Figure 7C:
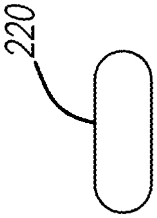
Figure 7D:
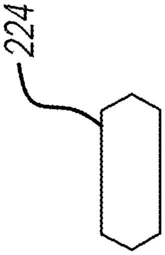
Figure 7E:
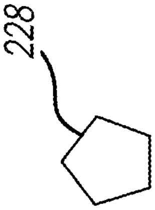
Figure 7F:
Figure 7G:
Figure 7H:
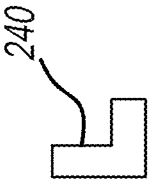
Figure 7I:
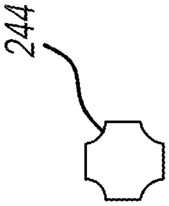
Figure 7J:
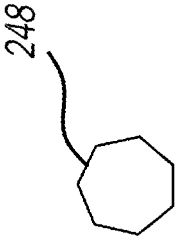
Figure 7K:
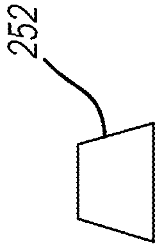
Figure 7L:
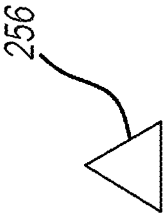

With additional reference to FIGS. 5A-7D and continuing reference to FIGS. 1-4B, the improved electric machine 110 can include different arrangements of the cross-bridge radial and axial oil cooling channels 154, 170 depending on the particular performance characteristics and design of the electric machine 110. For example, FIGS. 5A-5B illustrate an improved cooling arrangement where the stator 130 includes six sets of radial cross bridge channels 198 and each set of the cross-bridge channels 198 includes five cross bridge channels 198. As another example, FIGS. 6A-6B illustrate an improved cooling arrangement where the stator 130 includes none sets of radial cross bridge channels 198 and each set of the cross-bridge channels 198 includes eight cross bridge channels 198. It will be appreciated that other stator 130 cooling channel arrangements are contemplated and may be beneficial depending on design and performance characteristics of the electric machine 110, particularly the stator assembly 130.

With reference now to FIGS. 7A-7L and continuing reference to FIGS. 3-6B, various alternative shapes (in cross-section) for the axial channels 154, 170 and the radial cross bridge channels 198 are illustrated. The shapes shown in FIGS. 7A-7L represent the shape cut out or stamped into the rotor laminations 38 that, when stacked together as shown in FIGS. 3-6B, form the stator axial and radial channels 154, 170, 198. The shapes include a circular shape 212, a rectangular shape 216, a slot with rounded ends 220, a slot with converging ends 224, a pentagonal shape 228, a square shape 232, a diamond or rhombus shape 236, an L-shape or chevron shape 240, a cross shape 244, a heptagonal shape 248, a trapezoidal shape 252, and a triangular shape 256. It will be appreciated that channels 154, 170, 198 are not limited to the described shapes and could have various other shapes. Moreover, it will also be appreciated that each stator lamination 38 may have various combinations of shapes.

In operation, such as operation of the electrified vehicle using the electric machine 110, cooling oil 122, is circulated through the cooling oil circuit 118 including the stator cooling system 134 via pump 138 and the cooling oil sump 146. In one example implementation, pump 136 circulates cooling oil 122 from sump 146 into passages 264 of cooling oil circuit 118. The passages 264 can be located in the electric machine housing assembly 126. Cooling oil 122 is fed into the axial channels 154 in the stator yoke region 158 from one or both ends 46, 50 of the stator 130. The cooling oil 122 then flows axially along the channels 154 and radially inward to the stator teeth region axial channels 170. The cooling oil 122 then flows axially in the channels 170 and exits stator 130 and then sprays over and between the end windings 42 to cool the same.

As be seen in FIGS. 3-6B, and with particular reference to FIG. 3, the axial channels 154 include an inlet end 268 at one of the stator ends 46, 50 and a blind or closed opposite end 272 proximate the other of the stator axial ends 46, 50. This configuration facilitates, together with fluid flow pressure, driving the cooling oil 122 radially inward to the stator teeth axial channels 170. Axial channels 170 have a blind or closed end 276 at an end 46, 50 that is the same as the inlet end 268 of axial channels 154. The axial channels 170 correspondingly have an open or outlet end 280 that is at the same end 46, 50 as the axial channel 158 closed end 272. It should be appreciated that other oil channel inlet and outlet configurations are contemplated.

The cooling oil flowing through the channels 154, 170, 198 provides direct, improved cooling of the stator 130 and end windings 42, as well as improved indirect cooling of the rotor 22, including magnets 34, via heat transfer. This stator 130 cooling has been shown to be significantly more effective than merely cooling the axial ends of the stator. As a result of this improved cooling, the power and efficiency of the machine can be increased thereby using more potential of the rotor magnets without breaching the thermal limits of such magnets.

The stator axial channels 154, 170 enhance heat transfer from the bulk of the stator 130 and the stator windings as opposed to cooling only the stator axial ends. The overall surface area available for heat transfer is enhanced from the stator internal cooling channels while retaining the ability to cool the stator and rotor from external surfaces as well. The thermal management system 114 improves cooling of the electric machine while reducing mass of the stator and does not increase manufacturing complexity of assembling the electric machine. Moreover, the stator cooling system provides for reducing the air-gap temperature, which will lower the rotor and magnet temperature and thereby improve temperature uniformity of the electric machine, which leads to higher performance and efficiency of the improved electric machine.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Some portions of the above description may present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric machine having a thermal management system and for use in an electrified vehicle, the electric machine including a rotor, a stator and a housing, the electric machine comprising:

an oil feed channel at least partly positioned in the housing and configured to provide cooling oil to at least the stator;

the stator including:

a stator teeth region and a stator yoke region, the stator teeth region being proximate teeth of the stator and positioned radially inward of the stator yoke region, a plurality of first axial channels in the stator yoke region extending axially through the stator substantially from a first axial end to an opposed second axial end, a plurality of second axial channels in the stator teeth region extending axially through the stator substantially from the first axial end to the second axial end, the second axial channels being proximate the stator teeth and positioned radially inboard from the first axial channels, and at least one cross-bridge radial channel extending between and connecting a pair of radially opposed first and second axial channels of the plurality of first and second axial channels;

wherein the electric machine is configured to receive the cooling oil into the first and second plurality of axial channels such that the cooling oil flows axially and radially within the stator to cool at least the stator.

2. The electric machine of claim 1, wherein each of the plurality of first axial channels have a first open end and an opposed first closed end, and wherein each of the plurality of second axial channels have a second open end and an opposed second closed end.

3. The electric machine of claim 2, wherein the first closed end is positioned at one of the first and second axial ends, and the second closed end is positioned at the other of the first and second axial ends.

4. The electric machine of claim 1, wherein cooling oil enters the stator via the first open end of the plurality of first axial channels, and exits the stator via the second open end of the plurality of second axial channels.

5. The electric machine of claim 4, wherein the cooling oil exiting the stator via the second open end sprays onto end windings of the electric machine to cool the end windings.

6. The electric machine of claim 2, wherein the at least one cross-bridge radial channel includes a plurality of cross-bridge radial channels spaced apart axially along and connecting the pair of opposed first and second axial channels between the first and second open and closed ends of the pair of radially opposed first and second axial channels.

7. The electric machine of claim 6, wherein the pair of opposed first and second axial channels includes a plurality of pairs of opposed first and second axial channels spaced circumferentially apart around the stator, and wherein each of the plurality of pairs of opposed first and second axial channels includes the at least one cross-bridge channel.

8. The electric machine of claim 7, wherein each of the plurality of pairs of radially opposed first and second axial channels includes the plurality of cross-bridge radial channels spaced apart axially along and connecting each pair of opposed first and second axial channels between the first and second open and closed ends.

9. The electric machine of claim 1, wherein the plurality of first axial channels includes a same number of channels as the plurality of second axial channels.

10. The electric machine of claim 9, wherein the same number of channels is equal to a number of slots in the stator that form the stator teeth region.

11. The electric machine of claim 1, wherein the pair of radially opposed first and second axial channels includes a plurality of pairs of opposed first and second axial channels, wherein the at least one cross-bridge radial channel includes a plurality of cross-bridge radial channels, and wherein each pair of the plurality of pairs of radially opposed first and second axial channels includes the plurality of cross-bridge radial channels spaced apart axially along and connecting the pair of opposed first and second axial channels between the first and second open and closed ends.

12. The electric machine of claim 11, wherein a number of the plurality of pairs of radially opposed first and second axial channels including the plurality of cross-bridge radial channels is less than a total number of plurality of pairs of opposed first and second axial channels included in the stator.

13. The electric machine of claim 1, wherein the rotor includes a hollow shaft configured to receive the cooling oil and direct the same to contact the end windings to cool the end windings.

* * * * *